(12) United States Patent
Liu et al.

(10) Patent No.: US 6,447,452 B1
(45) Date of Patent: Sep. 10, 2002

(54) SYSTEM AND METHOD FOR REDUCTION OF PARALLEL BEAMFORMING ARTIFACTS

(75) Inventors: D-L Donald Liu, Issaquah; John C. Lazenby, Fall City; Zoran Banjanin, Newcastle; Bruce A. McDermott, Bellevue, all of WA (US)

(73) Assignee: Siemens Medical Solutions USA, Inc., Iselin, NJ (US)

( * ) Notice: Subject to any disclaimer, the term of this patent is extended or adjusted under 35 U.S.C. 154(b) by 14 days.

(21) Appl. No.: 09/606,494

(22) Filed: Jun. 29, 2000

(51) Int. Cl.[7] ............................................. A61B 8/00
(52) U.S. Cl. ............................................. 600/443; 73/625
(58) Field of Search ............................ 600/447, 454, 600/443, 437, 453, 455; 382/298

(56) References Cited

U.S. PATENT DOCUMENTS

| | | | | |
|---|---|---|---|---|
| 4,886,069 A | * | 12/1989 | O'Donnell | 128/661.01 |
| 5,105,814 A | * | 4/1992 | Drukarey et al. | 128/660.07 |
| 5,230,339 A | * | 7/1993 | Charlebois | 600/447 |
| 5,623,928 A | * | 4/1997 | Wright et al. | 600/447 |
| 5,718,230 A | * | 2/1998 | Chapman et al. | 128/661.01 |
| 5,940,123 A | * | 8/1999 | Daigle et al. | 348/163 |
| 5,976,089 A | * | 11/1999 | Clark | 600/447 |

OTHER PUBLICATIONS

Liu, Dong–Lai and Waag, Robert. "Propagation and Backproagation for Ultrasonic Wavefront Design." Jan. 1997, IEEE Transactions on Ultrasonics, Ferroelectrics, and Frequency Control, vol. 44, No. 1, pp. 1–13.*

Dong–Lai Liu, et al., "Propagation and Backpropagation for Ultrasonic Wavefront Design" IEEE Transactions on Ultrasonics, Ferroelectrics, and Frequency Control, vol. 44, No. 1, Jan. 1997.

* cited by examiner

Primary Examiner—Marvin M. Lateef
Assistant Examiner—Ruby Jain

(57) ABSTRACT

A system and method for reducing parallel beamforming artifacts. An interpolation of amplitude data is performed to correct for the blocky appearance of images formed with parallel receive beams. In addition, the transmit beam is modified to approximate a rectangular beam.

17 Claims, 3 Drawing Sheets

SYSTEM AND METHOD FOR REDUCTION OF PARALLEL BEAMFORMING ARTIFACTS

BACKGROUND OF THE INVENTION

1. Field of the Invention

The present invention relates to ultrasound systems and, in particular, a system and method for reducing parallel receive beamforming artifacts.

2. Description of the Related Art

In conventional B mode ultrasound imaging, the transmit pulse and the receive pulse are collinear. That is, each transmit pulse is received collinearly as a series of echoes, resulting in a scan line on a display.

However, the need to scan a field of view rapidly while maintaining adequate line density has led to the development of "multiple beam" techniques, wherein two or more independent receive beams are simultaneously formed to detect the echoes from a single transmit beam. However, with such a transmit beam, the resulting two-way beam pattern (i.e., the product of the transmit and the receive beam) is distorted and bent toward the axis of the transmit beam. The discrepancy results in errors in the scan conversion, resulting in a blocky appearance, termed "parallel beamforming artifact."

As such, it is desirable to correct for the blocky appearance of images formed with parallel receive beams.

SUMMARY OF THE INVENTION

These and other problems in the prior art are overcome in large part by a system and method according to the present invention. According to one implementation of the invention, interpolation of amplitude data is used to correct for the blocky appearance of images formed with parallel receive beams. The interpolation coefficients are derived from the amplitude data itself.

According to another implementation of the invention, the transmit beam shape and the receive beam positions are adjusted such that the two-way beams are as uniformly distributed as possible. In one implementation, the transmit beam is modified to approximate a rectangular beam.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1–5 illustrate an improved system and method for reducing parallel beamforming artifacts. An interpolation of amplitude data is performed to correct for the blocky appearance of images formed with parallel receive beams. In addition, the transmit beam is modified to approximate a rectangular beam.

Figure 1:
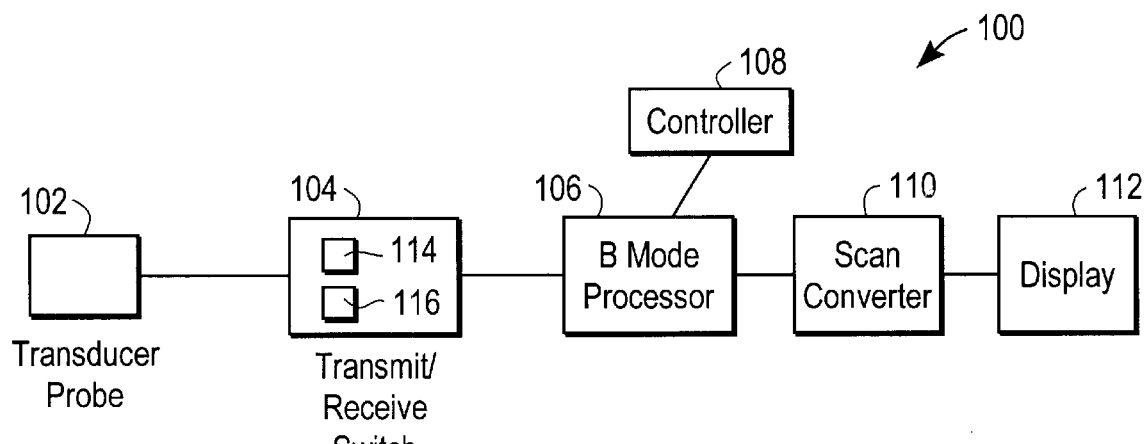
FIG. 1 is a block diagram of an ultrasound system according to an implementation of the invention.

Turning now to FIG. 1, a block diagram of an ultrasound imaging system according to an embodiment of the present invention is illustrated. The ultrasound imaging system 100 includes a transducer probe 102 configured to radiate and receive ultrasound waves. The transducer probe 102 is coupled to a transmit/receive circuit 104 and a B mode processor 106. The B mode processor 106 is, in turn, coupled to a scan converter 110, which provides an output to a display device 112. A controller 108 is further coupled to control the various devices. It is noted that, while the various functions are illustrated as being implemented as discrete hardware components, they may be implemented in varying degrees of integration as ASICs or microprocessors, or software. Thus, FIG. 1 is exemplary only.

The transmit/receive circuit 104 includes a gated oscillator 114 and a gated receiver 116. The system controller 108 provides a user interface (e.g., control panel, display menu, keyboard and the like) (not shown) and generally controls system operations. In operation, the system controller 108 triggers the gated oscillator 114 to generate electrical signals for output to the transducer probe 102. The transducer probe 102 converts the electrical signals into an ultrasound transmit pattern. Typically, the transducer is positioned adjacent to and in contact with a patient's anatomy. The transmit pulse wave pattern propagates into the patient's anatomy where it is refracted, absorbed, dispersed and reflected. The signal components which are reflected back to the transducer probe 102 are sensed and converted back into electrical signals. The signals are then input to the receiver 116 which amplifies the signals. A plurality of receive signals are received for each transmit signal.

The B mode signals are transferred to the B mode processor 106 which includes, for example, amplifiers, envelope detectors and analog-to-digital converters (not shown). The output from the B mode processor 106 is then provided to a scan converter 110. The scan converter 110 is provided because the received signals are in a vector domain or polar coordinates, whereas the display device is in raster domain or rectangular coordinates. The scan converter 110 thus converts the received polar coordinate image into raster coordinate display and interpolates outputs for those raster pixel locations which do not exactly coincide with the received vector points. The scan converter 110 outputs the B mode image to a display device 112.

According to the present invention, the B mode processor 106 is adapted to interpolate received two-way beams and also shape them to an appropriate profile.

Figure 2:
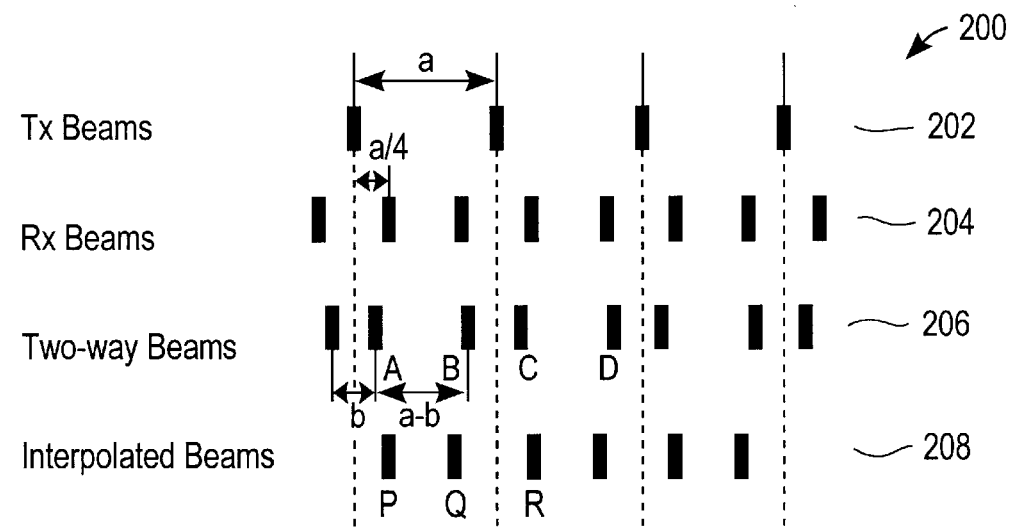
FIG. 2 is a diagram schematically illustrating beam interpolation according to an implementation of the invention.

Operation of an implementation of the invention is shown schematically with reference to FIG. 2. Shown are a plurality of transmit beams 202 separated by a distance a. Two receive beams 204 are received to form the receive scan lines and are symmetric about the axis of the transmit beam, separated by a distance from the transmit beam axis of a/4. As noted above, however, the actual two-way beams 206 are bent toward the transmit beam axis and separated by only a distance b, less than a/2. Scan conversion and display of the two way beams 206 results in the artifacts described above. According to the present invention, however, interpolated beams 208 are derived, located at the separation distance of a/4 from the corresponding transmit beam axis.

For example, (A, B, C, D) are the actual two-way beams 206, where $A=(a_n, a_{n+1}, \ldots, a_{n+m-1})^T$ represents log-detected amplitude data for a certain beam from a starting depth n and contains m samples. The length m of the vectors is chosen as a compromise between depth resolution and stability in the estimation of interpolation coefficients. Then, (P, Q, R) are the interpolated beams computed by the following Equation 1:

$$P = (1-\epsilon)A + \epsilon B$$

$$Q = (1-\epsilon)B + \epsilon A$$

$$R = (1-\epsilon)C + \epsilon D$$

where $\epsilon$ represents an interpolation coefficient, which is generally depth dependent and may also be beam index dependent. The cross correlation function (ccf) at zero lag between (P,Q) and (Q,R) can be found as $$ccf[P,Q] = [(1-\epsilon)^2 + \epsilon^2]ccf[A,B] + 2\epsilon(1-\epsilon)ccf[A,A]$$

$$ccf[Q,R] = [(1-\epsilon)^2 ccf[B,C] + \epsilon^2 ccf[A,D] + 2\epsilon(1-\epsilon)ccf[A,C]$$

It is assumed that, on average, the ccf of A and C is equal to the ccf of B and D, and the ccf of A and A is equal to the ccf of B and B. Next, $\epsilon$ is adjusted such that the ccf [P, Q]=ccf [Q,R]. Assuming that $\epsilon$ is small, and ignoring the $\epsilon^2$ terms, we arrive at $$(1-\epsilon)\overline{ccf[A,B]} + 2\epsilon \overline{ccf[A,A]} = (1-\epsilon)\overline{ccf[B,C]} + 2\epsilon \overline{ccf[A,C]}$$

where the overbar denotes averaging over receive beams in the neighborhood. If $\epsilon$ is only depth dependent, then averaging can be taken over all the receive beams at the same depth. Solving the above equation for $\epsilon$ yields Equation 2:

$$\varepsilon = \frac{1}{2\gamma + 1}$$

$$\text{where } \gamma = \frac{\overline{ccf[A, A]} - \overline{ccf[A, C]}}{\overline{ccf[B, C]} - \overline{ccf[A, B]}}$$

The cross correlation functions at zero lag are computed as $$\overline{ccf[A, B]} = AvgOverBeamIndex\left\{\frac{A^T B}{\sqrt{A^T A}\sqrt{B^T B}}\right\}$$

For successive depths, significant computation savings can be realized by exploiting the overlap between intervals. For example, if $A = (a_n, a_{n+1}, \ldots, a_{n+m-1})^T$ and $B = (b_n, b_{n+1}, \ldots, b_{n+m-1})^T$ then $$A_{n+1}^T B_{n+1} = A_n^T B_n + a_{n+m} b_{n+m} - a_n b_n$$

Similar formulae can be derived for interpolation of four or more parallel receive beams. It is noted that, while the above discussion focuses on linear interpolation between two beams, other interpolation techniques, such as higher-order interpolation techniques involving more beams can be used, and are considered within the scope of the invention.

Figure 3:
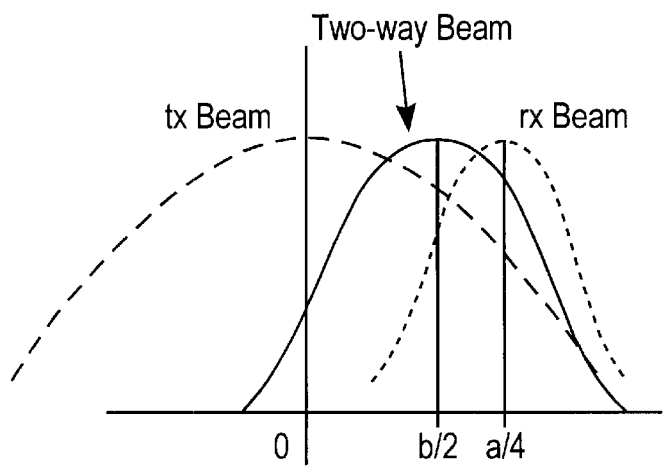
FIG. 3 is a diagram illustrating transmit, receive, and two way beams.

Once the value for $\epsilon$ has been determined, the correct beam positions can be derived. For example, assume both the transmit and the receive beams are Gaussian in shape. Further, let the transmit and receive beams have characteristic widths $w_t$ and $w_r$, respectively, and be centered at $x=0$ and $x=a/4$, respectively, as shown in FIG. 3. The two way beam is the product of the transmit and the receive beams and is written as:

$$\exp\left[-\frac{x^2}{2w_t^2}\right] \cdot \exp\left[-\frac{(x-a/4)^2}{2w_r^2}\right]$$

whose center is at $$\frac{a}{4} \cdot \frac{w_t^2}{w_t^2 + w_r^2} \equiv \frac{b}{2}$$

To interpolate the two-way beams A (positioned at b/2) and B (positioned at a−b/2) such that the interpolated beam P is positioned at a/4, the interpolation coefficient $\epsilon$ can be determined based on the linear relationship:

$$\varepsilon = \left(\frac{a}{4} - \frac{b}{2}\right) \div \left[\left(a - \frac{b}{2}\right) - \frac{b}{2}\right]$$

Substituting the formula for b in this result, the relation between $w_t$, $w_r$, and $\epsilon$ is found to be $$\varepsilon = \frac{w_r^2}{4w_r^2 + 2w_t^2}$$

Using this result, the distance between the two-way beam center (b/2) and the original receive beam center (a/4) can be written as $$\frac{a}{4} - \frac{b}{2} = \frac{a}{2} \cdot \frac{\varepsilon}{1 - 2\varepsilon}$$

Alternatively, the amount of shifting needed to the receive beam for the two-way beam to be positioned at a/4 may be determined. Thus, the receive beam should be positioned at x=h, such that $$h \cdot \frac{w_t^2}{w_t^2 + w_r^2} = \frac{a}{4}$$

The distance between the new receive beam position h and the original receive beam position a/4 is $$h - \frac{a}{4} = \frac{a}{4} \cdot \frac{w_r^2}{w_t^2} = \frac{a}{4} \cdot \frac{2\varepsilon}{1 - 4\varepsilon}$$

It is noted that, while the example above uses Gaussian shaped transmit and receive beams, similar results are obtainable in the more general cases.

The filter of Equation 1 may be implemented in a variety of ways. For example, the filter may be implemented as a two tap moving average filter, in which the values for $\epsilon$ itself are determined using the Equation 2 above. The filter of Equation 1 may also be implemented as a three tap filter with coefficients that alternate between (0, 1−$\epsilon$,$\epsilon$) and ($\epsilon$, 1−$\epsilon$, 0).

The above-described three tap alternating lateral interpolation filter can be combined with a three tap edge enhancement filter to yield a five tap filter. An edge enhancement filter may be a known high pass filter, for example. That is, the three tap interpolation filter may be convolved with the edge enhancement filter to yield a five tap filter.

Figure 4A:
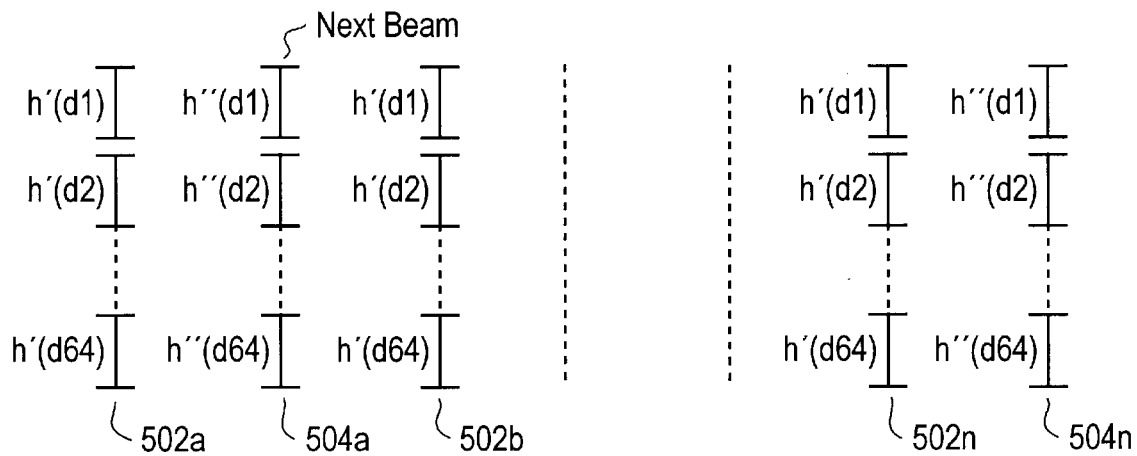
FIG. 4 is a diagram of an exemplary lateral filter according to an implementation of the invention.

FIG. 4A is a diagram schematically representing an exemplary implementation of such a filter. Shown are a plurality of two way beams 502a–502n, and 504a–504n. The filter is implemented as two sets of alternating coefficients on applied on odd lines (502a–502n) and even lines (504a–504n). In the implementation shown, the filter coefficients h'($d_i$) and h"($d_i$), where $d_i$ each have five values, are depth dependent with the subscript i ranging from 1 to 64. That is, a five tap filter is implemented at each of 64 depths.

Figure 4B:
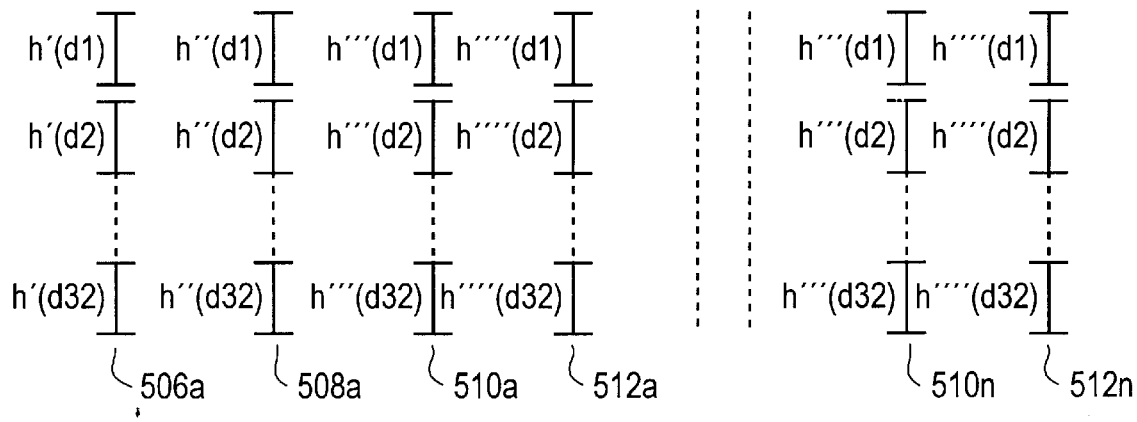

FIG. 4B illustrates a similar implementation in the case where four receive beams are received per transmit beam. That is, beams 506a–506n, 508a–508n, 510–510n, and 512a–512n are received. In that case, four sets of coefficients h'($d_i$), h"($d_i$), h'''($d_i$) and h""($d_i$) are required at each depth $d_i$. In the implementation shown, the subscript i ranges from 1 to 32, i.e., there are 32 depth related changes to the coefficients.

As noted above, another aspect of the invention is to form a rectangular transmit beam to minimize clustering effects on the receive beam. A properly specified wavefront can be produced by back propagating the wavefront from the plane of specification to the transducer plane and assigning the backpropagated wavefront as the transducer excitation signals. According to the present invention, the desired transmit wavefront is approximated with a wavefront having the same waveform with different amplitudes and time delays. This approximation technique means that the use of programmable linear transmitters can be avoided. More specifically, the desired transmit wavefront $s_i(t)$ is corrected for geometry and time delay and an approximate transmit wavefront is generated. That is, the transmit wavefront $g_i(t)=a_i s(t-T_i)$, where $T_i$ is the estimated delay, $a_i$ is the root mean square (RMS) amplitude of each backpropagated signal, and s(t) is an average pulse obtained by averaging all the aligned waveforms together and normalized to have a unit RMS amplitude.

Figure 5:
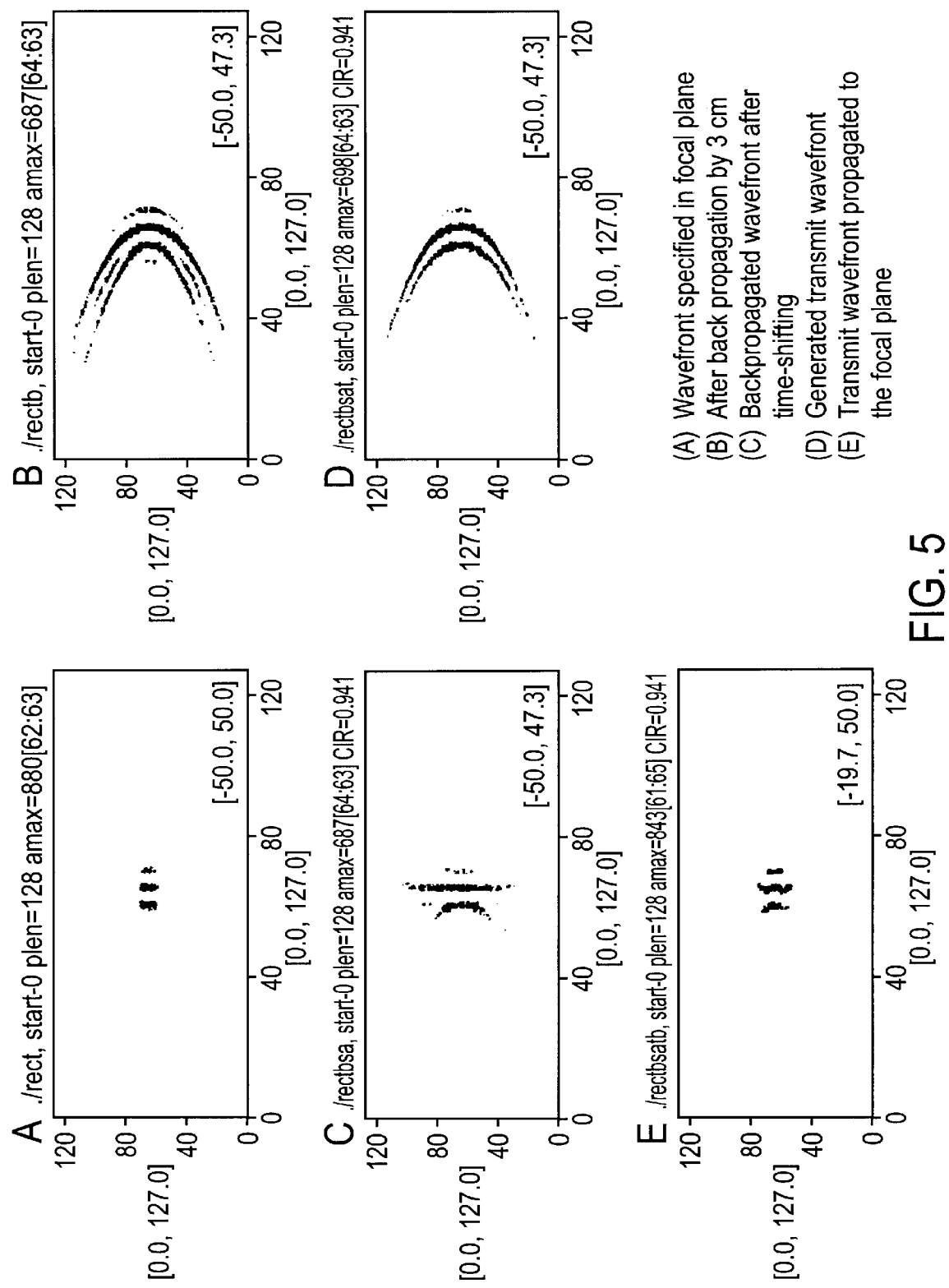
FIG. 5 is a diagram illustrating beam shaping according to an implementation of the invention.

This is illustrated more clearly with reference to FIG. 5. In the example of FIG. 5, a rectangular beam of width 1 mm with a cosine roll off of 1 mm on each side is specified at a distance of 3 cm. The center frequency is 7 MHz with a 70%–6 dB bandwidth. The assumed array has 128 elements with a pitch of 0.2 mm.

FIG. 5A illustrates the waveform desired to occur at the focal plane. FIG. 5B illustrates the waveform after backpropagation by 3 cm. FIG. 5C illustrates the backpropagated wavefront after time shifting. FIG. 5D illustrates the generated transmit wavefront, and FIG. 5E illustrates the resulting transmit wavefront propagated to the focal plane. Further details regarding this technique are available in Liu et al., Propagation and Backpropagation for Ultrasonic Wavefront Design, IEEE Transactions on Ultrasonics, Ferroelectrics and Frequency Control, January 1997, which is hereby incorporated by reference in its entirety as if fully set forth herein.

The invention described in the above detailed description is not intended to be limited to the specific form set forth herein, but on the contrary, it is intended to cover such alternatives, modifications and equivalents as can reasonably be included within the spirit and scope of the appended claims.

What is claimed is:

1. An ultrasound system, comprising:
   transmit and receive circuitry for transmitting transmit ultrasound signals and receiving a plurality of receive ultrasound signals for each transmit ultrasound signal; and
   a processor adapted to determine interpolation coefficients for resulting two-way beams based on received amplitude data, the two-way beams and the received amplitude data responsive to the receive ultrasound signals.

2. An ultrasound system in accordance with claim 1, said processor further adapted to determine locations of said two-way beams using said interpolation coefficients.

3. An ultrasound system in accordance with claim 1, said processor further adapted to define a transmitted ultrasound wavefront having a specified shape.

4. An ultrasound system in accordance with claim 3, said wavefront comprising a generally rectangular wavefront.

5. An ultrasound system in accordance with claim 1, said interpolation coefficients determined substantially according to the following, where $\epsilon$ are the interpolation coefficients, (A, B, C, D) are the actual two-way beams and where $A=(a_n, a_{n+1}, \ldots, a_{n+m-1})^T$ represents amplitude data for a certain beam from a starting depth n and contains m samples, T represents a vector transpose operation:

$$\varepsilon = \frac{1}{2\gamma+1}, \quad \text{where } \gamma = \frac{\overline{ccf[A,A]} - \overline{ccf[A,C]}}{\overline{ccf[B,C]} - \overline{ccf[A,B]}}, \quad \text{and}$$

$$\overline{ccf[A,B]} = AvgOverBeamIndex\left\{\frac{A^T B}{\sqrt{A^T A}\sqrt{B^T B}}\right\}$$

6. An ultrasound system in accordance with claim 5, wherein interpolated beams are determined according to:

$$P=(1-\epsilon)A+\epsilon B$$

$$Q=(1-\epsilon)B+\epsilon A$$

$$R=(1-\epsilon)C+\epsilon D.$$

7. A method, comprising:
   receiving a plurality of receive ultrasound beams for each of a plurality of transmit beams; and
   determining interpolation coefficients for resulting two-way beams based on received amplitude data.

8. A method in accordance with claim 7, including determining locations of said two-way beams using said interpolation coefficients.

9. A method in accordance with claim 7, including defining a transmitted ultrasound wavefront having a specified shape.

10. A method in accordance with claim 9, said wavefront comprising a generally rectangular wavefront.

11. A method in accordance with claim 7, said interpolation coefficients $\epsilon$ determined substantially according to the following, where $\epsilon$ are the interpolation coefficients, (A, B, C, D) are the actual two-way beams and where $A=(a_n, a_{n+1}, \ldots, a_{n+m-1})^T$ represents amplitude data for a certain beam from a starting depth n and contains m samples, where T represents a vector transpose operation:

$$\varepsilon = \frac{1}{2\gamma+1}, \quad \text{where } \gamma = \frac{\overline{ccf[A,A]} - \overline{ccf[A,C]}}{\overline{ccf[B,C]} - \overline{ccf[A,B]}}, \quad \text{and}$$

$$\overline{ccf[A,B]} = AvgOverBeamIndex\left\{\frac{A^T B}{\sqrt{A^T A}\sqrt{B^T B}}\right\}$$

12. A method in accordance with claim 11, wherein interpolated beams are determined according to:

$$P=(1-\epsilon)A+\epsilon B$$

$$Q=(1-\epsilon)B+\epsilon A$$

$$R=(1-\epsilon)C+\epsilon D.$$

13. An ultrasound system, comprising:
a transducer for sending a plurality of ultrasound transmit pulses and receiving a plurality of receive pulses for each of said plurality of transmit pulses; and
a processor adapted to process receive beams by interpolating two-way beam amplitude data.

14. A system according to claim 13, wherein said processor determines said receive beams substantially according to:

$P=(1-\epsilon)A+\epsilon B$ $Q=(1-\epsilon)B+\epsilon A$ $R=(1-\epsilon)C+\epsilon D$ where A, B, C, and D are original two-way beams, P, Q, and R are interpolated receive beams, and $\epsilon$ is an interpolation coefficient.

15. A system according to claim 1, wherein said processor implements one or more five tap filters to determine said two-way beams.

16. A system according to claim 13, wherein said processor implements linear interpolation between pairs of two-way beams to determine said receive beams.

17. A system according to claim 13, wherein said processor implements interpolation involving more than two two-way beams to determine said receive beams.

* * * * *